(12) United States Patent
 Mahnad

(10) Patent No.: US 8,593,921 B1
(45) Date of Patent: Nov. 26, 2013

(54) OPTICAL MEDIA SERVO TRACKING

(71) Applicant: Oracle International Corporation, Redwood City, CA (US)

(72) Inventor: Faramarz Mahnad, Brookline, MA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 13/731,384

(22) Filed: Dec. 31, 2012

(51) Int. Cl.
 *G11B 7/00* (2006.01)
(52) U.S. Cl.
 USPC ...................................................... 369/44.42
(58) Field of Classification Search
 USPC .......... 369/44.27, 44.42, 44.28, 44.29, 44.41, 369/53.28, 53.29, 44.43, 44.34
 See application file for complete search history.

(56) References Cited

U.S. PATENT DOCUMENTS

| 7,164,630 | B2 * | 1/2007 | Nakane et al. | 369/44.32 |
| 7,609,599 | B2 * | 10/2009 | Juan | 369/53.23 |
| 7,916,598 | B2 * | 3/2011 | Feng et al. | 369/53.23 |
| 8,134,909 | B2 * | 3/2012 | Yamamoto et al. | 369/275.3 |
| 2007/0076546 | A1 * | 4/2007 | Shimizu et al. | 369/44.29 |
| 2008/0151722 | A1 * | 6/2008 | Hara et al. | 369/53.23 |
| 2011/0158070 | A1 * | 6/2011 | Hsin et al. | 369/53.22 |

* cited by examiner

*Primary Examiner* — Nabil Hindi
(74) *Attorney, Agent, or Firm* — Brooks Kushman P.C.

(57) ABSTRACT

An optical media storage system includes an optical pickup that unit that reads data marks from a track of optical media, detects a relative position between the optical pickup unit and the data marks, and detects a relative position between the optical pickup unit and the track. The storage system further includes an actuator and a controller that commands the actuator to position the optical pickup unit based on both of the detected relative positions.

13 Claims, 4 Drawing Sheets

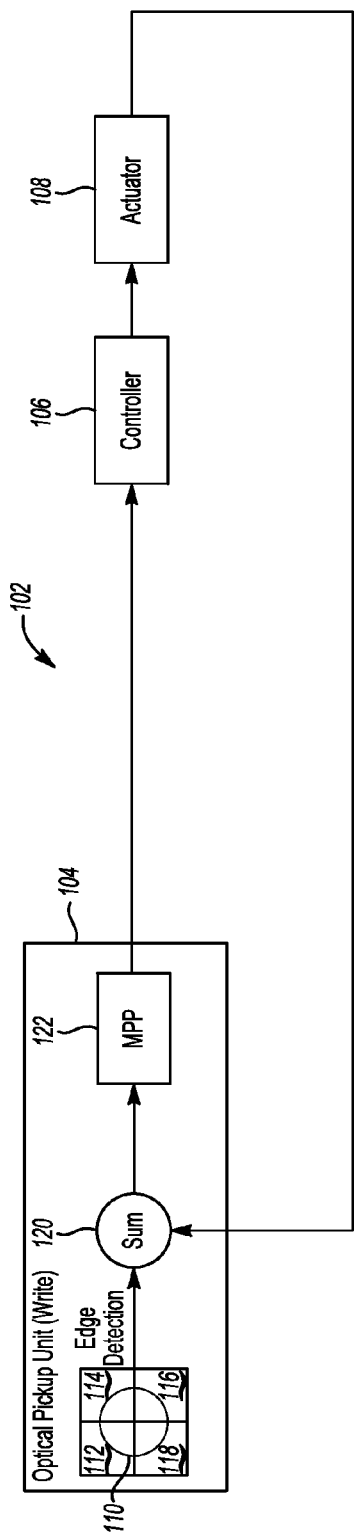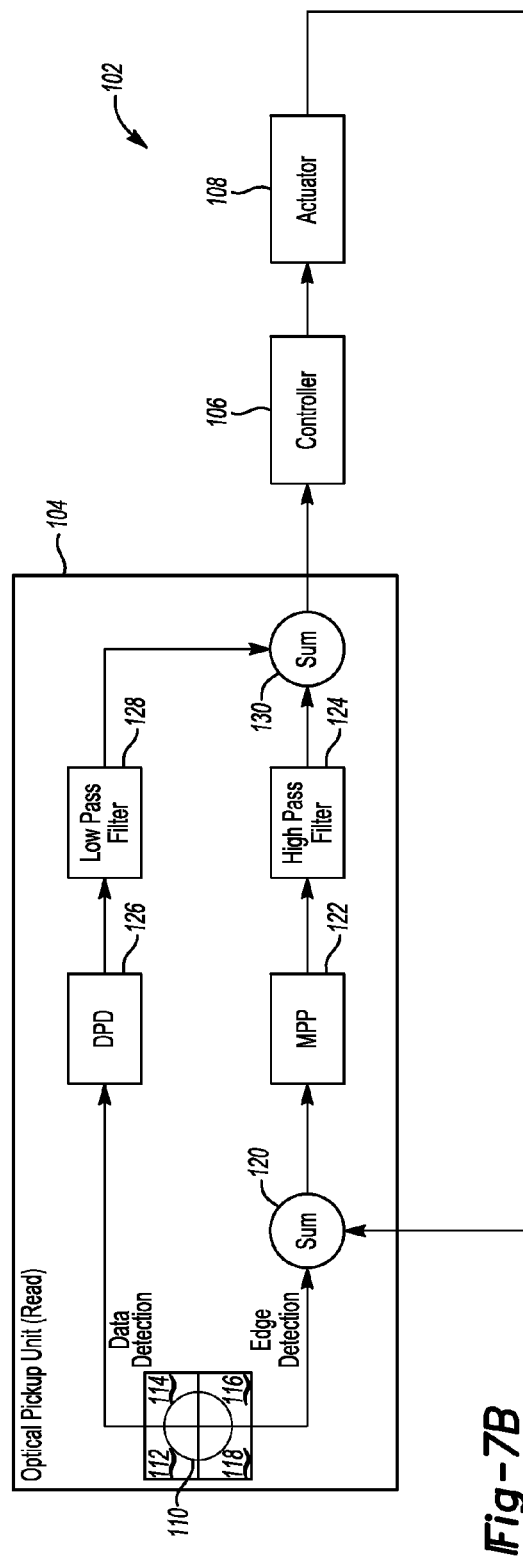

OPTICAL MEDIA SERVO TRACKING

TECHNICAL FIELD

This disclosure relates to optical media servo systems.

BACKGROUND

Optical tape is a data storage medium. In certain examples, it can take the form of long narrow strips onto which patterns can be written and from which patterns can be read. Optical tape may facilitate higher data transfer rates, greater storage capacity, and reduced access times relative to magnetic tape. Moreover because optical tape is written and read using optical pick up units that do not touch the recording surface of the tape, it may be more durable than magnetic tape.

SUMMARY

An optical media storage system includes an optical pickup unit, an actuator, and a controller. The optical pickup unit reads data marks from a track of optical media, detects a relative position between the optical pickup unit and the data marks, and detects a relative position between the optical pickup unit and the track. The controller commands the actuator to position the optical pickup unit based on both of the detected relative positions. The optical pickup unit may generate a differential phase detection tracking signal indicative of the relative position between the optical pickup unit and the data marks. The optical pickup unit may generate a main push pull tracking signal indicative of the relative position between the optical pickup unit and the track. The optical pickup unit may filter out frequency content of the differential phase detection tracking signal for frequencies greater than a threshold frequency and filter out frequency content of the main push pull tracking signal for frequencies less than the threshold frequency. The optical pickup unit may combine the filtered differential phase detection tracking signal and the filtered main push pull tracking signal to generate a hybrid tracking signal. The controller may command the actuator to position the optical pickup unit based on the detected relative positions according to the hybrid tracking signal. The track may be defined by land and groove. Detecting a relative position between the optical pickup unit and the track may include detecting a relative position between the optical pickup unit and edges of the land and groove. The optical media may be optical tape.

A method for controlling an optical pickup unit may include detecting a relative position between the optical pickup unit and data marks within a track of optical media, detecting a relative position between the optical pickup unit and the track, and positioning the optical pickup unit based on both of the detected relative positions. The method may further include generating a differential phase detection tracking signal indicative of the relative position between the optical pickup unit and the data marks. The method may further include generating a main push pull tracking signal indicative of the relative position between the optical pickup unit and the track. The method may further include filtering out frequency content of the differential phase detection tracking signal for frequencies greater than a threshold frequency and filtering out frequency content of the main push pull tracking signal for frequencies less than the threshold frequency. The method may further include combining the filtered differential phase detection tracking signal and the filtered main push pull tracking signal to generate a hybrid tracking signal. Positioning the optical pickup unit based on the detected relative positions may include processing the hybrid tracking signal. The track may be defined by land and groove. Detecting a relative position between the optical pickup unit and the track may include detecting a relative position between the optical pickup unit and edges of the land and groove. The optical media may be optical tape.

An optical media system includes an optical pickup unit. The optical pickup unit includes a laser diode configured to generate a laser beam to read data marks from a track of optical media, a plurality of detectors configured to detect data indicative of a relative position between the optical pickup unit and the data marks, and data indicative of a relative position between the optical pickup unit and the track, and circuitry configured to generate a differential phase detection tracking signal based on the data indicative of a relative position between the optical pickup unit and the data marks. The optical pickup unit further includes circuitry configured to generate a main push pull tracking signal based on the data indicative of a relative position between the optical pickup unit and the track, a filter configured to filter out frequency content of the differential phase detection tracking signal greater than a threshold value, another filter configured to filter out frequency content of the main push pull tracking signal less than the threshold value, and circuitry configured to combine the filtered signals to generate a hybrid tracking signal. The track may be defined by land and groove. Detecting a relative position between the optical pickup unit and the track may include detecting a relative position between the optical pickup unit and edges of the land and groove. The optical media may be optical tape.

BRIEF DESCRIPTION OF THE DRAWINGS

FIGS. 7A and 7B are schematic diagrams of an optical system including an optical pickup unit configured to produce MPP and DPD tracking signals.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In high track-per-inch optical storage systems, reliable retrieval of data depends on the performance of associated tracking servo systems. Study of track mis-registration in these systems, which can cause performance degradation and loss of data, reveals the importance of accurately positioning the optical head over the track containing data. Present tracking servo systems for rewritable optical media position the optical head over the perceived data track based on reference tracking signals generated by the optical pickup unit according to its diffraction properties and the physical format of the media. Because these types of positioning systems typically depend entirely on reference tracking signals and not the actual location of written data, they are subject to track mis-registration due to various disturbances and anomalies, such as the misalignment between mechanical and optical subsystems or variation from optical pickup unit to optical pickup unit. Optical pickup unit to optical pickup unit variation can be particularly apparent, manifesting as track mis-registration, when media is written with one optical pickup unit and read by another.

Figure 1:
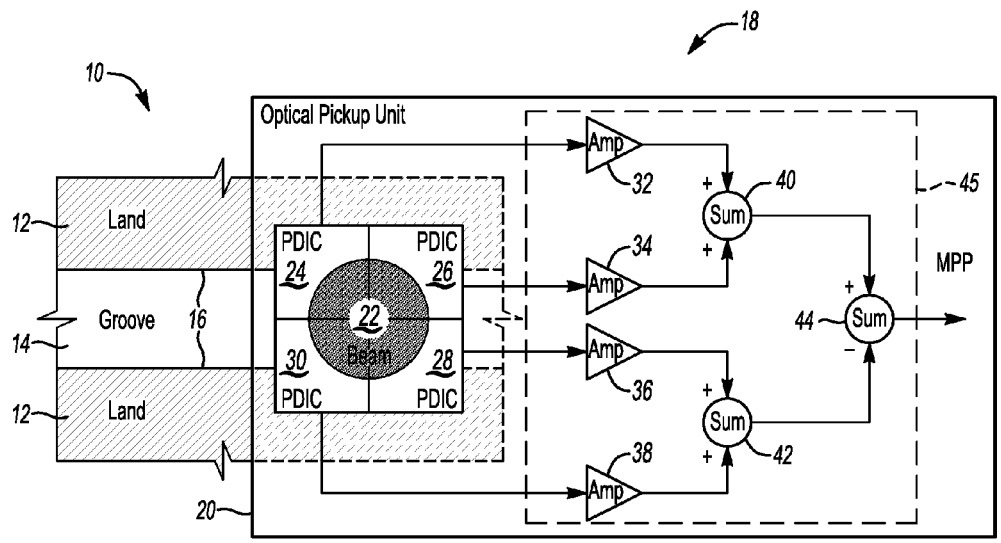
FIG. 1 is a schematic diagram of rewritable optical media and an optical pickup unit configured to produce a main push pull (MPP) or radial push pull tracking signal.

Referring to FIG. 1, rewritable optical media 10 may include land 12 and groove 14. Data may be written to or read from phase change material within the groove 14 as known in the art. The land 12 and groove 14 define edges 16, which as explained below can be used for tracking purposes.

An optical system 18 may include, among other things, an optical pickup unit 20. The optical pickup unit 20 may include infrastructure, such as laser diodes, etc., to generate laser beam 22, quadrature photodiode integrated circuit (quad-PDIC) detectors 24, 26, 28, 30, amplifiers 32, 34, 36, 38, sum blocks 40, 42, and difference block 44. (Those of ordinary skill will recognize this configuration as main push pull (MPP) or radial push pull tracking infrastructure 45. The phrase "main push pull" is typically used within the context of optical tape or optical disk media. The phrase "radial push pull" is typically used within the context of disk media. From a conceptual standpoint, these phases can be used interchangeably.)

Output from the detectors 24, 26, 28, 30, which is indicative of the position of the edges 16 relative to the optical pick up unit 20, is fed to the amplifiers 32, 34, 36, 38 respectively. Output from the amplifiers 32, 34 is fed to the sum block 40. Output from the amplifiers 36, 38 is fed to the sum block 42. Output from the sum blocks 40, 42 is fed to the difference block 44. The resulting output can be referred to as a MPP or radial push pull tracking signal.

Figure 2:
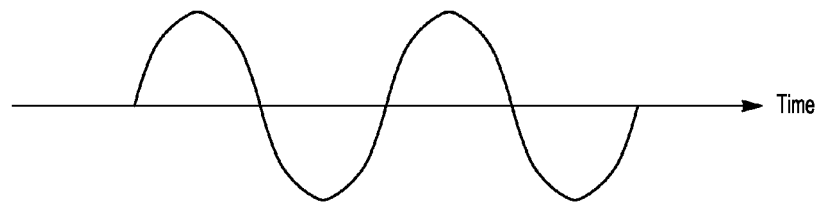
FIG. 2 is a plot of an example MPP tracking signal.

The shape of a MPP signal reflects the relative movement between the edges 16 and optical pick up unit 20. A MPP signal having the shape of a horizontal line, for example, would indicate that the laser beam 22 is centered between the edges 16. A MPP signal having the shape of a sinusoid, for example, would indicate that the laser beam 22 is moving relative to the edges 16. FIG. 2 shows an example of such a signal. The optical system 18 would thus attempt to control the position of the optical pick up unit 20 to minimize this behavior.

Figure 3:
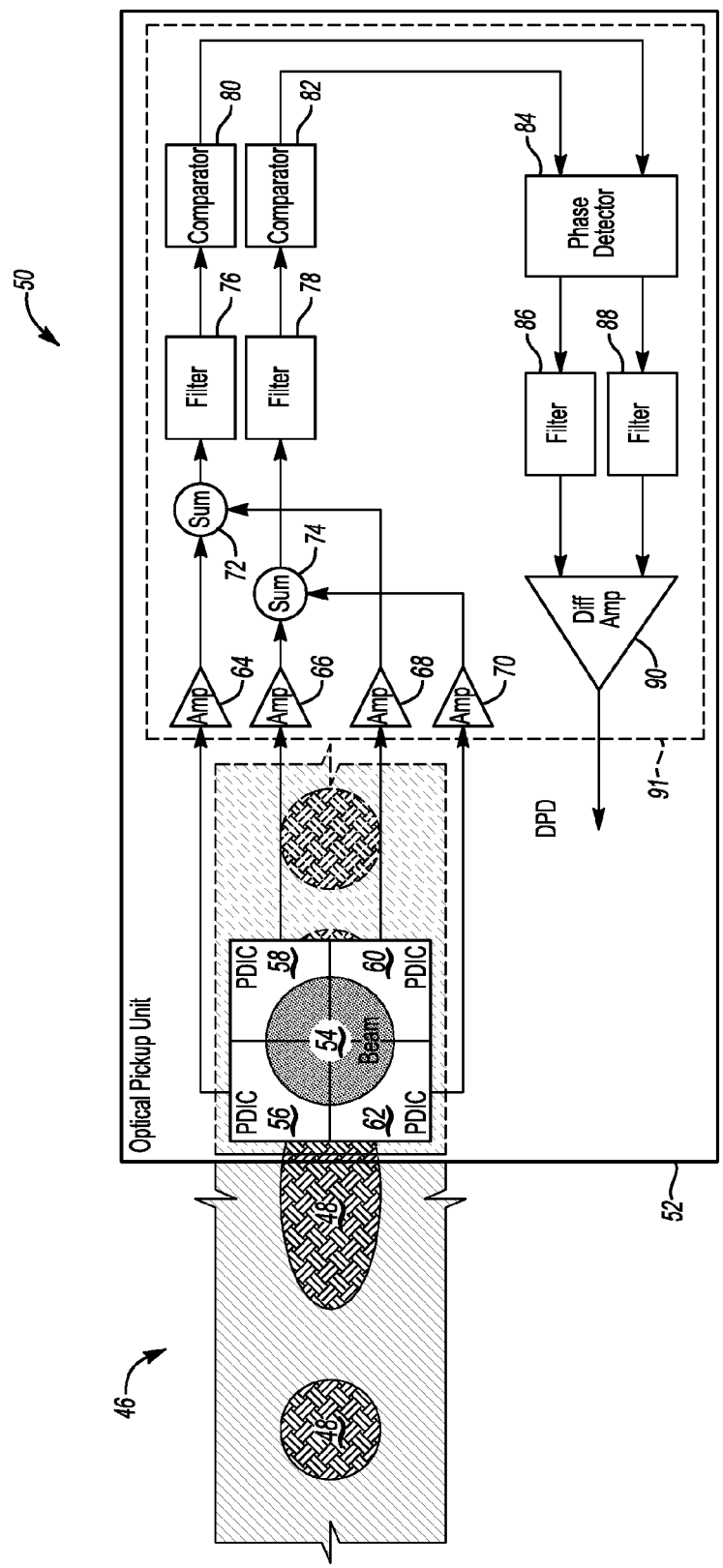
FIG. 3 is a schematic diagram of read only optical media and an optical pickup unit configured to produce a differential phase detection (DPD) tracking signal.

Referring to FIG. 3, read only optical media 46 may include data marks 48 written in phase change material. (Unlike rewritable optical media 10, the media 46 lacks land and groove. Therefore, edges cannot be used for tracking purposes.)

An optical system 50 may include, among other things, an optical pickup unit 52. The optical pickup unit 52 may include infrastructure, such as diodes, etc., to generate laser beam 54, quad-PDIC detectors 56, 58, 60, 62, amplifiers 64, 66, 68, 70, sum blocks 72, 74, filters 76, 78, comparators 80, 82, phase detector 84, filters 86, 88, and differential amplifier 90. (Those of ordinary skill will recognize this configuration as differential phase detection (DPD) tracking infrastructure 91.)

Output from the detectors 56, 58, 60, 62, which is indicative of the relative position between the data marks 48 and optical pick up unit 52, is fed to the amplifiers 64, 66, 68, 70 respectively. Output from the amplifiers 64, 68 is fed to the sum block 72. Output from the amplifiers 66, 70 is fed to the sum block 74. Output from the sum block 72 follows a path through the filter 76, comparator 80, phase detector 84, and filter 86 to the differential amplifier 90. Likewise, output from the sum block 74 follows a path through the filter 78, comparator 82, phase detector 84, and filter 88 to the differential amplifier 90. The resulting output can be referred to as a DPD tracking signal.

Figure 4:
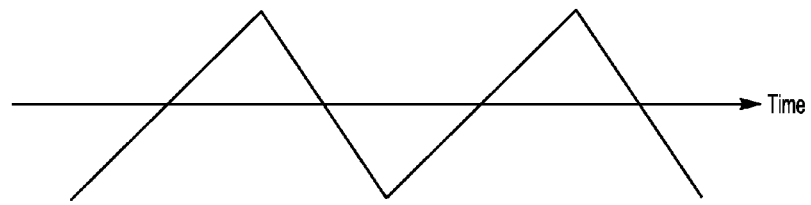
FIG. 4 is a plot of an example DPD tracking signal.

The shape of a DPD signal reflects the relative movement between the data marks 48 and optical pick up unit 52. A DPD signal having the shape of a horizontal line, for example, would indicate that the laser beam 54 is centered on the data marks 48. A DPD signal having the shape of saw teeth, for example, would indicate that the laser beam 54 is moving relative to the data marks 48. FIG. 4 shows an example of such a signal. The optical system 50 would thus attempt to control the position of the optical pick up unit 52 to minimize this behavior.

Figure 5:
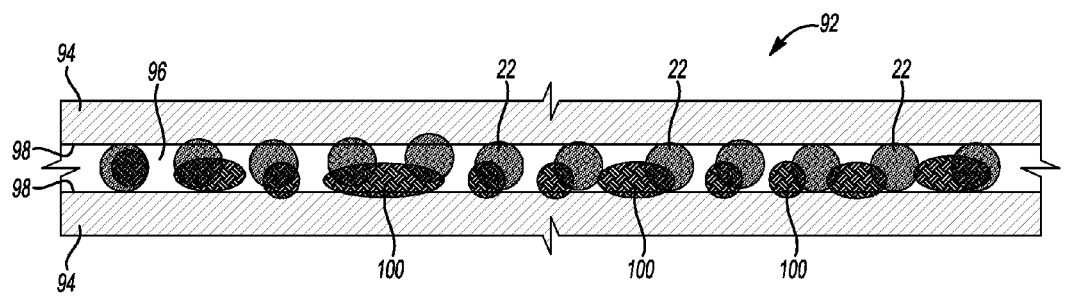
FIG. 5 is a schematic diagram of rewritable optical media including data and the relative location of a laser spot generated by the optical pickup unit of FIG. 1.

Referring to FIG. 5, rewritable optical media 92, such as optical tape, may include land 94 and groove 96. The land 94 and groove 96 define edges 98. Data marks 100 have been written in phase change material within the groove 96. The data marks 100, however, are not centered between the edges 98. That is, they are offset from the center of the groove 96. Such offset may result from misalignment, mis-calibration, etc. of the optical system used to write the data marks 100 as mentioned above.

An optical system, such as the optical system 18 of FIG. 1, may be used to read the data marks 100. As explained above however, the optical system 18 will attempt to center the laser beam 22 between the edges 98—regardless of the location of the data marks 100—because it uses MPP or radial push pull tracking technology. This misalignment between the laser beam 22 and data marks 100 may interfere with the data reading process.

Figure 6:
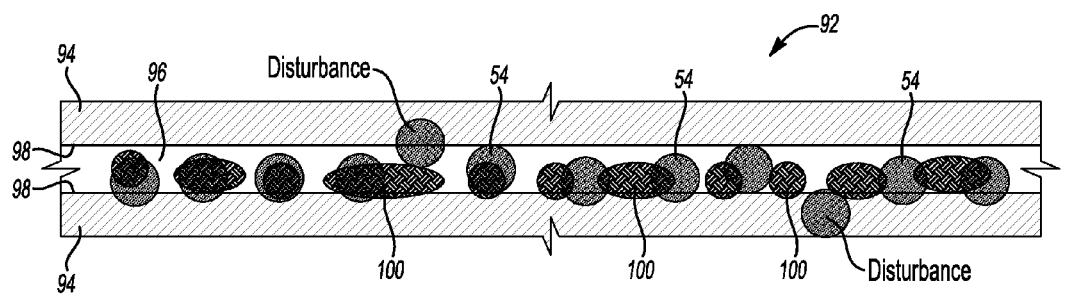
FIG. 6 is a schematic diagram of the rewritable optical media of FIG. 5 and the relative location of a laser spot generated by the optical pickup unit of FIG. 3.

Referring to FIG. 6, an optical system, such as the optical system 50 of FIG. 3, may be used to read the data marks 100. As explained above however, the optical system 50 will attempt to center the laser beam 54 on the data marks 100—regardless of the location of the edges 98—because it uses DPD tracking technology. DPD tracking technology, however, does not respond well to high-frequency disturbances. The optical tape 92 as it is fed through the optical system 50 may experience high-frequency lateral tape movement (movement perpendicular to the direction of tape motion) relative to the laser beam 54. Hence, the optical tape 92 may move laterally away from the laser beam 54 more quickly than the DPD tracking technology used by the optical system 50 can correct for such movement, causing the laser beam 54 to jump relative to the data marks 100. This disturbance between the laser beam 54 and data marks 100 may interfere with the data reading process.

Referring to FIGS. 7A and 7B, an optical system 102 includes an optical pickup unit 104, a controller 106, and an optical pickup unit actuator 108. Signals generated by the optical pickup unit 104 are processed by the controller 106 and used by the actuator 108 to position the optical pickup unit 104 relative to optical media.

The optical pickup unit 104 may include infrastructure, such as diodes, etc., to generate laser beam 110, quad-PDIC detectors 112, 114, 116, 118, sum block 120, MPP tracking infrastructure 122, high pass filter 124, DPD tracking infrastructure 126, low pass filter 128, and sum block 130. The MPP tracking infrastructure 122 is similar to the MPP tracking infrastructure 45 of FIG. 1. The DPD tracking infrastructure 126 is similar to the DPD tracking infrastructure 91 of FIG. 3. Other optical pickup unit architectures are, of course, also possible.

During a write operation (see FIG. 7A), the DPD tracking infrastructure 126 and the low pass filter 128 are inactive. Signals generated in response to edges being detected (that is, in response to land and groove structures being detected) from optical media (not shown) by the laser beam 110 are fed to the sum block 120 along with a feedback signal from the actuator 108. The resulting signal is fed to the MPP tracking infrastructure 122. The MPP tracking signal output by the MPP tracking infrastructure 122 may then be used by the controller 106 to control operation of the actuator 108 to attempt to maintain a position of the laser beam 110 centered between edges of the optical media.

During a read operation (see FIG. 7B), signals generated in response to data being detected from optical media (not shown) by the laser beam 110 are fed to the MPP tracking infrastructure 122 via the sum block 120 and the DPD tracking infrastructure 126. Low frequency content of the MPP tracking signal output by the MPP tracking infrastructure 122 may be filtered out by the high pass filter 124. For example, frequency content of the MPP tracking signal less than 300 Hz may be filtered out by the high pass filter 124. (Other threshold frequencies may also be used depending on media characteristics and other design parameters. Optimum threshold frequencies may be determined via testing, simulation, etc.) High-frequency content of the DPD tracking signal output by the DPD tracking infrastructure 126 may be filtered out by the low pass filter 128. For example, frequency content of the DPD tracking signal greater than 300 Hz may be filtered out by the low pass filter 128. (As mentioned above, other threshold frequencies may be used.) The tracking signals are then fed to sum block 130. The resulting hybrid MPP/DPD tracking signal may then used by the controller 106 to control operation of the actuator 108 to attempt to maintain the position of the laser beam 110 based on a relative position of the laser beam 110 to edges of the optical media and a relative position of the laser beam 110 to data marks in the optical media.

Figure 8:
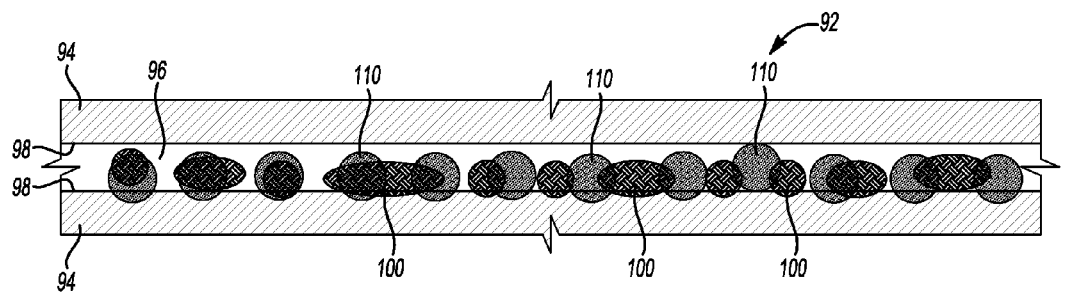
FIG. 8 is a schematic diagram of the rewritable optical media of FIG. 5 and the relative location of a laser spot generated by the optical pickup unit of FIG. 7B.

Referring to FIG. 8, the optical system 102 of FIGS. 7A and 7B, may be used to read the data marks 100. As explained above, the optical system 102 will attempt to control the position of the optical pickup unit 104 based on the relative position of the laser beam 110 between the edges 98 and the relative position between the data marks 100 and laser beam 110. Relative to the exclusive use of either MPP tracking technology (as described with reference to FIG. 5) or DPD tracking technology (as described with reference to FIG. 6), the hybrid approach can account for offset in the data marks 100 relative to the center of the groove 96 as well as correct for lateral movement of the optical tape 92 relative to the direction of tape motion.

The offset in data marks 100 relative to the center of the groove 96 can be captured in the low frequency content associated with the DPD tracking signal because of the "DC" and low frequency nature of such offsets. Because the magnitude of such offsets is relatively constant over extended sections of media, high-frequency content is not needed to capture it. Lateral motion of the optical tape 92, on the other hand, can be relatively erratic and therefore best captured in the high-frequency content associated with the MPP tracking signal. That is, low frequency content of the MPP tracking signal is not needed to capture relative movement between the edges 98 and laser beam 110.

While exemplary embodiments are described above, it is not intended that these embodiments describe all possible forms encompassed by the claims. Tracking techniques other than DPD and MPP, for example, may be used. Any tracking technique that can capture data indicative of the relative position between an optical pickup unit and data marks being read by the optical pickup unit may be used. Likewise, any tracking technique, such as Differential Push Pull, that can capture data indicative of the relative position between an optical pickup unit and some physical characteristic of the optical media being read by the optical pickup unit may be used. Additionally, filtering techniques other than high and low pass filtering techniques, such as discriminating or matched filter techniques, can be used to process the data indicative of the relative position of the optical pickup unit to the data marks and physical characteristics of the optical media as desired, etc.

The words used in the specification are words of description rather than limitation, and it is understood that various changes may be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An optical media storage system comprising:
   an optical pickup unit configured to read data marks from a track of optical media, to detect a relative position between the optical pickup unit and the data marks, to generate a differential phase detection tracking signal indicative of the relative position between the optical pickup unit and the data marks, to detect a relative position between the optical pickup unit and the track, to generate a main push pull signal indicative of the relative position between the optical pickup unit and the track, to filter out frequency content of the differential phase detection tracking signal for frequencies greater than a threshold frequency, and to filter out frequency content of the main push pull tracking signal for frequencies less than the threshold frequency;

an actuator; and a controller programmed to command the actuator to position the optical pickup unit based on both of the detected relative positions.

2. The system of claim 1 wherein the optical pickup unit is further configured to combine the filtered differential phase detection tracking signal and the filtered main push pull tracking signal to generate a hybrid tracking signal.

3. The system of claim 2 wherein the controller is further programmed to command the actuator to position the optical pickup unit based on the detected relative positions according to the hybrid tracking signal.

4. The system of claim 1 wherein the track is defined by land and groove and wherein detecting a relative position between the optical pickup unit and the track includes detecting a relative position between the optical pickup unit and edges of the land and groove.

5. The system of claim 1 wherein the optical media is optical tape.

6. A method for controlling an optical pickup unit comprising:

detecting, by an optical pickup unit, a relative position between the optical pickup unit and data marks within a track of optical media;

generating a differential phase detection tracking signal indicative of the relative position between the optical pickup unit and the data marks;

detecting, by the optical pickup unit, a relative position between the optical pickup unit and the track;

generating a main push pull tracking signal indicative of the relative position between the optical pickup unit and the track;

filtering out frequency content of the differential phase detection tracking signal for frequencies greater than a threshold frequency;

filtering out frequency content of the main push pull tracking signal for frequencies less than the threshold frequency; and positioning, by an actuator, the optical pickup unit based on both of the detected relative positions.

7. The method of claim 6 further comprising combining the filtered differential phase detection tracking signal and the filtered main push pull tracking signal to generate a hybrid tracking signal.

8. The method of claim 7 wherein positioning the optical pickup unit based on the detected relative positions includes processing the hybrid tracking signal.

9. The method of claim 8 wherein the track is defined by land and groove and wherein detecting a relative position between the optical pickup unit and the track includes detecting a relative position between the optical pickup unit and edges of the land and groove.

10. The method of claim 6 wherein the optical media is optical tape.

11. An optical media system comprising:

an optical pickup unit including a laser diode configured to generate a laser beam to read data marks from a track of optical media, a plurality of detectors configured to detect data indicative of a relative position between the optical pickup unit and the data marks, and data indicative of a relative position between the optical pickup unit and the track, circuitry configured to generate a differential phase detection tracking signal based on the data indicative of a relative position between the optical pickup unit and the data marks, circuitry configured to generate a main push pull tracking signal based on the data indicative of a relative position between the optical pickup unit and the track, a filter configured to filter out frequency content of the differential phase detection tracking signal greater than a threshold value, another filter configured to filter out frequency content of the main push pull tracking signal less than the threshold value, and circuitry configured to combine the filtered signals to generate a hybrid tracking signal.

12. The system of claim 11 wherein the track is defined by land and groove and wherein detecting a relative position between the optical pickup unit and the track includes detecting a relative position between the optical pickup unit and edges of the land and groove.

13. The system of claim 11 wherein the optical media is optical tape.

* * * * *

UNITED STATES PATENT AND TRADEMARK OFFICE
CERTIFICATE OF CORRECTION

| | | |
|---|---|---|
| PATENT NO. | : 8,593,921 B1 | Page 1 of 1 |
| APPLICATION NO. | : 13/731384 | |
| DATED | : November 26, 2013 | |
| INVENTOR(S) | : Mahnad | |

It is certified that error appears in the above-identified patent and that said Letters Patent is hereby corrected as shown below:

On the title page, column 2, item (57) under "Abstract", line 2, before "unit" delete "that".

Signed and Sealed this
Third Day of June, 2014

Michelle K. Lee
*Deputy Director of the United States Patent and Trademark Office*